United States Patent [19]

Morey

[11] 4,071,442

[45] Jan. 31, 1978

[54] METHOD AND APPARATUS FOR RECOVERY OF ALUMINUM FROM SOLID WASTE

[75] Inventor: Booker W. Morey, Pasadena, Calif.

[73] Assignee: Occidental Petroleum Corporation, Los Angeles, Calif.

[21] Appl. No.: 603,869

[22] Filed: Aug. 11, 1975

[51] Int. Cl.² .............................................. B03C 1/22
[52] U.S. Cl. .............................. 209/212; 209/223 A; 209/227
[58] Field of Search ............................... 209/212–214, 209/223 A, 231, 232, 307, 215, 3, 218; 198/41, 85

[56] References Cited

U.S. PATENT DOCUMENTS

| 402,904 | 5/1889 | Conkling | 209/214 X |
|---|---|---|---|
| 555,533 | 3/1896 | Randolph | 209/307 |
| 677,677 | 7/1901 | Messiter | 198/85 X |
| 1,729,589 | 5/1924 | Nirdet | 209/214 |
| 2,006,870 | 2/1933 | Neuman | 198/443 |
| 2,074,085 | 3/1937 | Frantz | 209/222 X |
| 2,833,393 | 5/1958 | Kay | 198/85 |
| 3,049,305 | 8/1962 | Rath | 209/214 X |
| 3,067,852 | 12/1962 | Barr | 198/41 X |
| 3,595,386 | 7/1971 | Hradel | 209/232 X |
| 3,824,516 | 7/1974 | Benowitz | 209/212 |
| 3,848,743 | 11/1974 | Danberg | 209/218 |
| 3,950,661 | 4/1976 | Langmuir | 209/227 X |

*Primary Examiner*—Robert Halper
*Attorney, Agent, or Firm*—Christie, Parker & Hale

[57] ABSTRACT

A comminuted trash mixture containing aluminum and other non-ferrous conductive metals is transferred to a conveyor system having a series of conveyor belts, each successive belt having a higher linear velocity than the preceding belt. A linear motor type separator adjacent the highest speed belt diverts the non-ferrous conductive metals off to one side of the conveyor where it is received by a second conveyor system including a plurality of conveyor belts of successively higher linear speed. A second linear motor type separator is used to divert non-ferrous conductive metals off to one side of the second conveyor group, with the remaining materials on the conveyor being transferred back to the beginning of the first conveyor group for recirculation through the first separator.

6 Claims, 4 Drawing Figures

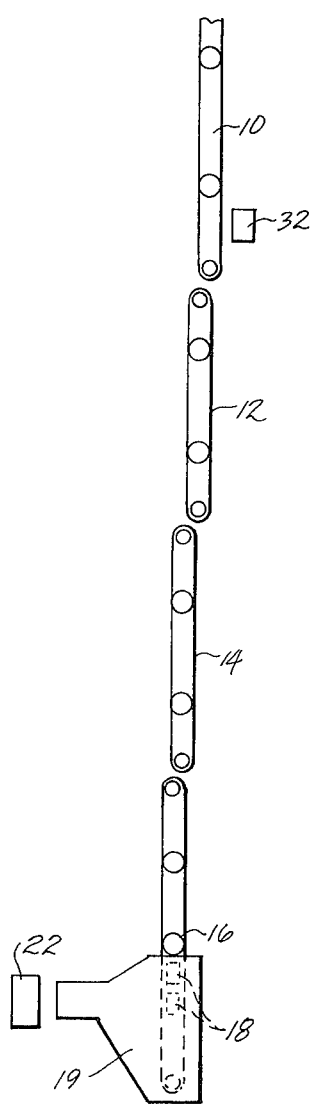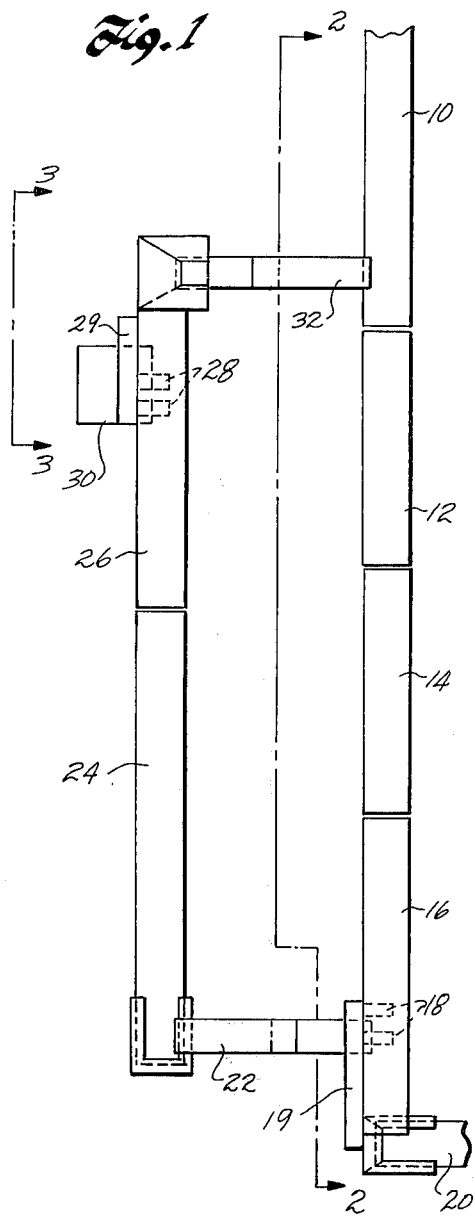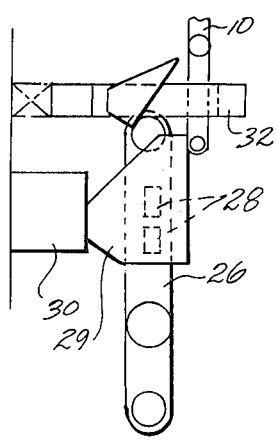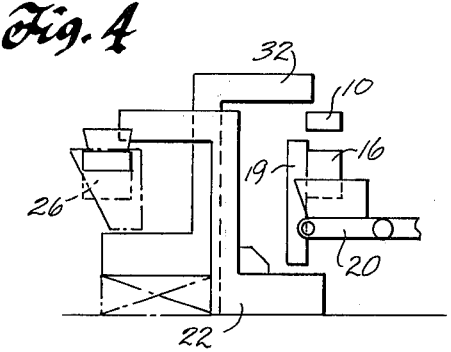

METHOD AND APPARATUS FOR RECOVERY OF ALUMINUM FROM SOLID WASTE

FIELD OF THE INVENTION

This invention relates to solid waste disposal systems, and more particularly, is concerned with a method and apparatus for separating out aluminum and other non-ferrous conductive metals from comminuted trash.

BACKGROUND OF THE INVENTION

With the ever increasing problem of disposing of solid waste coupled with the depletion of fuels, metals, and other natural resources, greater attention has been focused recently on recovery of recyclable materials as part of the solid waste disposal problem. One material which can be recycled and is found in common trash is aluminum, used extensively in containers, cans, foil, and other household related items. One method of separating aluminum and other non-magnetic conductive metals from trash is described in detail in copending application Ser. No. 450,007, filed Mar. 11, 1974, by the same inventor as the present application, wherein separation is accomplished by passing a mixture of materials through a linear motor force field. The linear motor produces a moving force field in the direction transverse to the path of movement of the trash mixture. The field reacts with the conductive metal material to induce eddy currents in the material, the eddy currents producing a magnetic field which reacts with the moving field of the linear motor. The metal parts are propelled by the moving field of the linear motor in a direction transverse to the trash mixture, thus separating the metal particles from the other materials in the trash mixture.

SUMMARY OF THE INVENTION

The present invention is directed to an improved method and apparatus for separating aluminum and other non-ferrous conductive materials from a mixture of trash utilizing a linear motor which provides substantially improved separation efficiency. This is accomplished in brief by providing a separator including a first group of conveyor belts serially aligned for conveying the trash mixture along a first path, each successive conveyor belt along the path operating at a higher liner speed than the previous conveyor belt to separate the individual particles. A linear motor adjacent the highest speed conveyor belts provides a moving force field which deflects the conductive metal fraction of the mixture off to one side of the conveyor belt where it is transferred to a second group of conveyor belts parallel to but moving in opposite direction to the first group, each successive belt of the second group having a higher linear speed than the previous conveyor of the group. A second linear motor adjacent the highest speed conveyor belt of the second group deflects the conductive metal fraction from the material on the second conveyor belt off one side of the conveyor belt where it is collected. The reamining fraction is returned to the start of the first conveyor belt for recirculation.

DESCRIPTION OF THE DRAWINGS

For a better understanding of the invention reference should be made to the accompanying drawings, wherein:

FIG. 1 is a plan view of the separator system of the present invention;

FIG. 2 is an end view of the conveyor system;

FIG. 3 is a partial side view; and

FIG. 4 is a sectional view along the line 4—4 of FIG. 1.

DETAILED DESCRIPTION

Referring to the drawing in detail, there is shown a conveyor system including an input conveyor belt 10. The conveyor belt is preferably made from heavy fabric or rubberized cord materials. A comminuted mixture of trash is conveyed by the input conveyor 10 after the trash has preferably been processed to remove glass and magnetic materials. The comminuted trash particles are preferably limited to a size in the order 4 inches by ½ inches.

The trash mixture, including conductive non-ferrous metals, is transferred by the input conveyor 10 at a linear speed determined by the throughput rate of the system, for example, on the order of 150 to 200 fpm.

The trash mixture from the input conveyor 10 is transferred onto the first of a group of three aligned belt conveyors in series, indicated at 12, 14, and 16, respectively. These conveyors are each in the form of an endless belt, with each successive belt in the group being driven at a higher linear speed than the previous belt. By way of example only, the linear speed of the conveyor 12 may be 200 fpm, the linear speed of conveyor 14 may be 400 fpm, and the linear speed of conveyor 16 may be 600 fpm. As each particle of trash moves from a conveyor belt to the next, it moves away from the following particles. The effect of transferring the comminuted mixture of weight materials through the group of conveyors therefore is to spread out the mixture along the path of movement. This spacing or thinning out of the mixture of waste particles has been found to greatly improve the separation efficiency produced by the linear motor separator.

one or more, i.e., at least one, linear motor separator units are positioned directly below the highest speed conveyor belt 16, as indicated at 18. This belt, as well as belt 26, should be essentially non-magnetic and non-conductive, e.g., a poor conductor. The linear motor is similar to the stator of a conventional induction motor, but with the stator in effect rolled out in a flat plane. Such linear motors are well known in the art, as discussed in the article "Linear-Motion Electrical Machines" by E. R. Laithwaite, proceedings of the IEE, Volume 58, No. 4, pages 531–542, April 1970. The linear motors 18 are positioned immediately below the upper belt portion of the endless belt conveyor to provide a moving magnetic force field which extends in a transverse direction to the path of movement of the trash. The moving magnetic force fields reacts with the conductive particles to produce a transverse force tending to move the conductive particles to the left, as viewed in FIG. 1. Thus the conductive metal particles are urged off the side of the conveyor belt 16 while the remaining non-conductive fraction of the trash mixture is conveyed along the same path by the conveyor belt 16 where it is deposited on an output conveyor 20.

The conductive metal fraction of the trash deflected off the conveyor by the linear motors is directed to a chute 19 onto the lift type conveyor 22 which moves the particles in a direction transverse to the path of the conveyor 16. The lift conveyor 22 raises the metal particles up and deposits them on top of a second group of aligned endless belt conveyors 24 and 26 which extend parallel to but travel in the opposite direction from the first group of conveyors 12, 14, and 16. The second group of conveyors also operate at successively higher linear speeds, the conveyor belt 24 for example having a linear speed of 200 fpm and the conveyor belt 26 moving at a linear speed of 400 fpm. A second pair of linear motors 28 is positioned adjacent to the end of the second high-speed conveyor 26 for deflecting the metal particles off the conveyor 26 through chute 29 into a tote box 30 or other suitable collection and storage means.

Any remaining non-conductive materials are diverted from the end of the conveyor 28 onto a lift conveyor 32 which returns the materials onto the input conveyor 10 for recycling.

The above described separator system provides improved overall separation efficiency by providing a secondary separator and recirculating the unseparated residue of the secondary separator. It has been found that a certain amount of organic trash material adheres to or is entrained by the deflected metal particles so that the material diverted by the first linear motor separator contains about 20% by weight of organic materials. The secondary separation produces a yield that is 96% metal.

What is claimed is:

1. A process for separating non-magnetic conductive materials from a comminuted particulate trash mixture, comprising the steps of:
    a. transferring the particulate trash mixture to a first transport line formed of a first group of serially aligned conveyor belts each having an upper belt portion and causing, by operating each successive conveyor belt at a higher linear velocity than the previous conveyor belt, the mixture to undergo stage wise increased in linear velocity to disperse the particles of trash during travel on said first transport line;
    b. subjecting the travelling dispersed particulate trash mixture to a transverse moving magnetic force field formed by at least one linear motor positioned below the upper belt portion of the conveyor belt of the first group having the highest linear velocity, to transversely withdraw and concentrate the non-magnetic conductive particles in a separate fraction;
    c. transferring the separated fraction to a second transport line formed of a second group of serially aligned conveyor belts each having an upper belt portion and dispersing the particles of the fraction on said second transport line by stage wise increases in linear velocity of the conveyor belts of the second group;
    d. subjecting the dispersed fraction of the second transport line to a second transverse moving magnetic force field, formed by at least one additonal linear motor positioned below the upper belt portion of the conveyor belt of the second group having the highest linear velocity, to selectively and transversely remove and further concentrate the non-magnetic conductive particles; and
    e. returning the remaining particles not removed by the second moving magnetic force field to the first transport line.

2. Apparatus for separating non-ferrous conductive metals from a mixture of comminuted trash, comprising:
    a. a first group of conveyor belts each having upper belt portions serially aligned for conveying the mixture along a first path, each successive conveyor belt along the path operating at a higher linear speed than the previous conveyor belt, whereby the mixture is accelerated and dispersed;
    b. at least one linear motor positioned directly below the upper belt portion of the highest speed conveyor belt producing a moving magnetic force field extending perpendicular to said path for defelcting the conductive metal fraction of the mixture off one side of the conveyor belt;
    c. a second group of serially aligned conveyor belts moving in a direction opposite to the first group of conveyor belts each having upper belt portions, each successive belt having a higher linear speed than the previous conveyor belt of the group;
    d. means for transferring the fraction of the mixture deflected off the side of the first conveyor belt group to the lowest speed conveyor belt of the second group;
    e. at least one linear motor positioned directly below the upper belt portion of the highest speed conveyor belt of the second group for deflecting conductive metal fraction on the second conveyor group off one side of the highest speed conveyor belt of the second group; and
    f. means for transferring the remaining material on the highest speed belt of the second conveyor belt group back to the lowest speed belt of the first group of conveyor belts.

3. Apparatus of claim 2 in which a pair of linear motors is positioned directly below the upper belt portion of the highest speed conveyor belt of the first group.

4. Apparatus of claim 2 in which the means for transferring the fraction of the mixture deflected off the side of the first conveyor belt group is a lift conveyor.

5. Apparatus of claim 2 in which the second group of conveyor belts is substantially parallel to the first group of conveyor belts and moves in the opposite direction.

6. Apparatus of claim 5 in which each said at least one linear motor is a pair of linear motors and each said means for transferring is a lift conveyor.

* * * * *

UNITED STATES PATENT AND TRADEMARK OFFICE
CERTIFICATE OF CORRECTION

PATENT NO. : 4,071,442
DATED : January 31, 1978
INVENTOR(S) : Booker W. Morey

It is certified that error appears in the above-identified patent and that said Letters Patent are hereby corrected as shown below:

Column 1, line 46, for "liner" read -- linear --; line 49, for "belts" read -- belt --; line 60, for "reamining" read -- remaining --. Column 2, line 62, for "to" read -- by --. Column 3, line 35, for "increased" read -- increases --. Column 4, line 21, for "defelcting" read -- deflecting --.

Signed and Sealed this

Fourth Day of July 1978

[SEAL]

Attest:

RUTH C. MASON
Attesting Officer

DONALD W. BANNER
Commissioner of Patents and Trademarks